D. P. BUSH & J. A. KRAUSPE.
Cartridge for Fire-Arms.
No. 207,248. Patented Aug. 20, 1878.
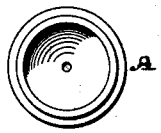
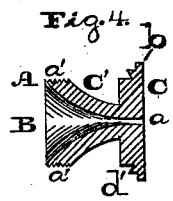
Witnesses:
Ro. P. Grant,
N. F. Kircher
Inventors:
D. P. Bush,
J. A. Krauspe,
by John A. Wiedersheim
ATTORNEY.

UNITED STATES PATENT OFFICE.

DAVID P. BUSH AND JULIUS A. KRAUSPE, OF WILMINGTON, DELAWARE.

IMPROVEMENT IN CARTRIDGES FOR FIRE-ARMS.

Specification forming part of Letters Patent No. 207,248, dated August 20, 1878; application filed May 31, 1878.

*To all whom it may concern:*

Be it known that we, DAVID P. BUSH and JULIUS A. KRAUSPE, both of Wilmington, in the county of New Castle and State of Delaware, have invented a new and useful Improvement in Cartridge-Shells, which improvement is fully set forth in the following specification and accompanying drawings, in which—

Figure 1 is a side elevation of the shell embodying our invention. Fig. 2 is a longitudinal section thereof. Fig. 3 is an end view. Fig. 4 is a sectional view of the breech-block detached.

Similar letters of reference indicate corresponding parts in the several figures.

Our invention consists of a breech-block having a tapering chamber, whose surface is of convex form, said chamber diminishing in diameter from front to rear and terminating in a small priming-aperture, thus enabling the application of the fire entirely behind the charge, so as to prevent recoil and insure the combustion of all of the powder, thus obtaining the greatest possible effect from the explosion, and preventing collection of sediment in the bottom of the chamber. The body of the breech-block is of conical form, and projects forward from the base of the block, a portion of the body at the base of the conical portion being screw-threaded to engage with the cylinder, and the base of the block having a shoulder or under-cut for holding the edge of the cylinder, whereby the breech-block and cylinder will be readily and securely joined and the weight of the cartridge materially reduced, the cylinder covering the space formed by the exterior conical shape of the body.

Referring to the drawings, A represents the breech-block, having a hollow body, C', the interior chamber, B, of which is of tapering form, its diameter diminishing from front to rear and terminating in a small priming-aperture, $a$, and the surface of the tapering chamber B is convex, as is clearly shown in Fig. 2.

C represents the base of the breech-block, and projecting forward therefrom is the body C', which is of conical form, the front portion, $a'$, whereof is screw-threaded for engagement with the inner face of the cylinder or shell D, the apex of the conical body being at the place of junction with the base.

On the circumference of the base C is the usual end flange $b$, and adjacent thereto a locking-groove or under-cut, $d$.

The breech is inserted into the cylinder D, the forward portion thereof screwing into the inner face thereof, and when it is in to its full extent the rear end or edge of the cylinder engages with the under-cut $d$ and locks therewith, whereby the breech is firmly secured to the cylinder and steadily supported, and the gases are prevented entering the space between the cylinder and conical body.

Prior to fitting the breech to the cylinder it is coated with glue or other cement.

The space between the conical body C' and cylinder D may be filled with some light material.

The breech may be made of metal, wood, paper, vulcanized fiber, &c., and the cylinder may be made of any suitable material; and it will be seen that we provide a strong, firmly-secured, and steadily-supported breech. The weight of the same, and consequently of the cartridge, is materially reduced.

Owing to the form of the chamber B, we are enabled to apply the fire entirely behind the charge, so as to prevent recoil and to insure the combustion of all of the powder, thereby obtaining the greatest effect from the explosion, besides preventing the collection of sediment in the bottom of the chamber.

Owing to the double or exterior and interior arch form of the block, we secure strength and elasticity, thus guarding bursting or splitting of the breech-block and increasing the shooting power.

Having thus described our invention, what we claim as new, and desire to secure by Letters Patent, is—

1. The conical body C', with exterior threads, conical chamber B, and perforated base C, in combination with the cylinder connected to said body and base, and covering the space of exterior conical form of the body, substantially as and for the purpose set forth.

2. The breech-block, consisting of the base

C, with under-cut or groove $d$, and conical body C', with threaded portion $a'$, substantially as and for the purpose set forth.

3. The base C, with under-cut or groove $d$, conical body C', with threaded portion $a'$, and tapering chamber B and the cylinder D, combined and operating substantially as and for the purpose set forth, and forming an improvement in cartridge-shells.

DAVID P. BUSH.
JULIUS A. KRAUSPE.

Witnesses:
J. MARIS,
J. E. PIERCE.